United States Patent [19]

Charbonneau

[11] Patent Number: 4,800,673

[45] Date of Patent: Jan. 31, 1989

[54] ARCHES DRIVER

[76] Inventor: Louis Charbonneau, 136, rue de la Gare, C.P. 750, St-Rémi, Québec, Canada, J0L 2L0

[21] Appl. No.: 125,609

[22] Filed: Nov. 25, 1987

[51] Int. Cl.⁴ .............................................. A01G 13/02
[52] U.S. Cl. ......................................... 47/1 R; 47/26; 47/29; 111/1
[58] Field of Search ........................................ 111/1-3; 47/1 R, 2, 9, 19, 26, 27, 28, 29, 45, 46, 47

[56] References Cited

U.S. PATENT DOCUMENTS

| | | | |
|---|---|---|---|
| 3,353,297 | 11/1967 | Gervais | 47/1 R |
| 4,186,520 | 2/1980 | Alper et al. | 47/1 R |
| 4,492,626 | 1/1985 | Kukes | 208/254 H |
| 4,658,538 | 4/1987 | Kolk et al. | 47/29 |

FOREIGN PATENT DOCUMENTS 2451156  11/1980  France ..................... 47/29

Primary Examiner—Brian S. Steinberger
Attorney, Agent, or Firm—Foley & Lardner, Schwartz, Jeffery, Schwaab, Mack, Blumenthal & Evans

[57] ABSTRACT

An apparatus for driving arches into the ground for the making of a cultivation tunnel comprises a drum-like body made of a pair of wheels interconnected by three transverse arcuate arch supports and rotatably mounted on a chassis. The ends of the arcuate arch supports are pivoted to the rims of the wheels adjacent the wheel spokes but behind them in the direction of rotation of the wheels. The arch supports are held within the two wheels and forced to diverge from the spokes by a spring mechanism. Each arch support defines an outwardly open trough into which an arch is inserted, being held in the trough by hooks that are resiliently biased into captive position of the arch in its support. A cam assembly on each arch support and on the chassis forces the arch support to move toward the vertical against the bias of the spring mechanism as the ends of the arch start to touch the ground. Further rotation of the wheels drives the arch ends into the ground. When each support and arch therein stand vertical, bars fixed to the spokes engage the hooks of the support and release them from the support, against their bias, to thus free the arch from its support.

9 Claims, 7 Drawing Sheets

ARCHES DRIVER

BACKGROUND OF THE INVENTION

1. Field of the Invention

The present invention generally relates to the art of making cultivation tunnels over seeded rows and more specifically to an apparatus serving to drive wire rod arches into the ground, along and over seeded rows, over which arches sheets of polyethylene or other similar translucent material are thereafter laid to complete the tunnels. These tunnels are of course made to provide favourable conditions for the development of growing seedings, including protection against frost.

2. Description of the Prior Art

In the past, the arches were obtained by first bending straight wire rod lengths and then manually driving them into the ground. The method is of course time consuming and thus expensive.

A search made prior to the drafting of the present specification has been made to determine the possible existence of various proposals at mechanization of the method. The patents found during the search are U.S. Pat. Nos. 3,353,297 to Gervais; 4,492,626 to Hammond and 4,186,520 to Alper et al.

The machine proposed by Gervais serves to lay a continuous protective sheet directly over a row of previously sown plants, seeds or seedlings but is not concerned with building cultivation tunnels and does not therefore use arches. Hammond, on the other hand, uses arches in the making of his tunnel but the invention bears on the particular structure of the arches to ensure firm securing of the plastic sheet over them. Nothing is said of the manner into which the arches are driven or planted into the ground.

Alper et al is however of more interest in that it is directed toward an apparatus for mechanically forming and mounting in position wire arches for the making of a cultivation tunnel. For this purpose, the Alper et al apparatus has a pair of lateral endless belts forming a pair of parallel downwardly inclined lower stretches extending in the direction of movement of the machine. A third endless belt is provided in the middle of the two lateral belts, having an upwardly inclined stretch followed by a downwardly inclined one above which is a fourth endless belt having a lower stretch disposed at a short distance from and parallel to the downwardly inclined stretch of the third belt; the two latter stretches forming a passage to guide the center of a rod being bent and drive it into the ground. The straight rod is first fed, at its center, to the upwardly inclined third belt and while moving up the incline, it is bent in the form of an arch by the stretches of the two lateral belts. As the bent rod reaches the passage between the third and fourth belts, it is moved downward and driven into the ground.

The Alper et al machine has the inconvenience of requiring a large number of drive and driven sprocket wheels of which the driven mechanisms further require additional sprocket wheels. The synchronization of the speeds of all the belts is complicated and yet has to be achieved with a certain accuracy otherwise the arches will not be properly bent and planted into the ground. Also, since there is no positive way of holding the legs of the arches against the two lateral belts, any slipping may also cause ill bending of the arches or faulty planting into the ground.

SUMMARY OF THE INVENTION

The present invention overcomes the above disadvantage of the Alper et al machine by providing an apparatus wherein the arches are solidly held throughout their length until they are driven into the ground. More particularly, each rod is lodged into a trough defined by an arcuate support pivotally mounted, at its ends, onto the rims of two wheels. The bent rod is locked into the trough of the support by two or more hooks. The arch support rotates, with the wheels, to drive the arch into the ground and as soon as this is achieved, that is when the arch is in vertical position, the hooks are moved away from the trough, allowing release of the arch while the support keeps on rotating to receive a further rod.

Specifically, the invention lies in the provision of an apparatus for driving wire rod arches into the ground for the making of a cultivation tunnel, the apparatus essentially comprising:

a chassis and a pair of wheels mounted on the chassis, each wheel having a rim and radial spokes with the wheels being rotative about a common axis;

an arcuate arch support, between the wheels, defining an outwardly open trough for the insertion and removal of an arch;

pivot means mounting the free ends of the arch support on the wheel rims; the pivot means being located adjacent a pair of the wheel spokes lying in a common radial plane; the support free ends being mounted for pivotal movement of the arch support about an axis parallel to the wheel common rotation axis; the pivot means being further located behind the pair of spokes with respect to the direction of rotation of the wheels;

first resilient means for holding the arch support inwardly and between the rims and in an inoperative position where the arch support diverges from the pair of spokes;

a plurality of hooks and means mounting the hooks on the arch support for pivotal movement of the hooks between a hooking position for holding an arch within the trough and a release position for allowing the arch to move out of the trough;

second resilient means biassing the hooks into the hooking position;

cam means on the arch support and on the chassis for pivoting the arch support from the inoperative position toward the adjacent wheel spokes and for holding the support in vertical position as the pivot means approaches the ground, and hook releasing means on the spokes of the pair of wheels; the releasing means engaging the hooks after the arch support has reached the vertical position for pivoting the hooks to the hook release position.

Other features and advantages of the invention will become apparent from the following description of a preferred embodiment, having reference to the accompanying drawing.

DESCRIPTION OF THE PREFERRED EMBODIMENT

Figure 1:
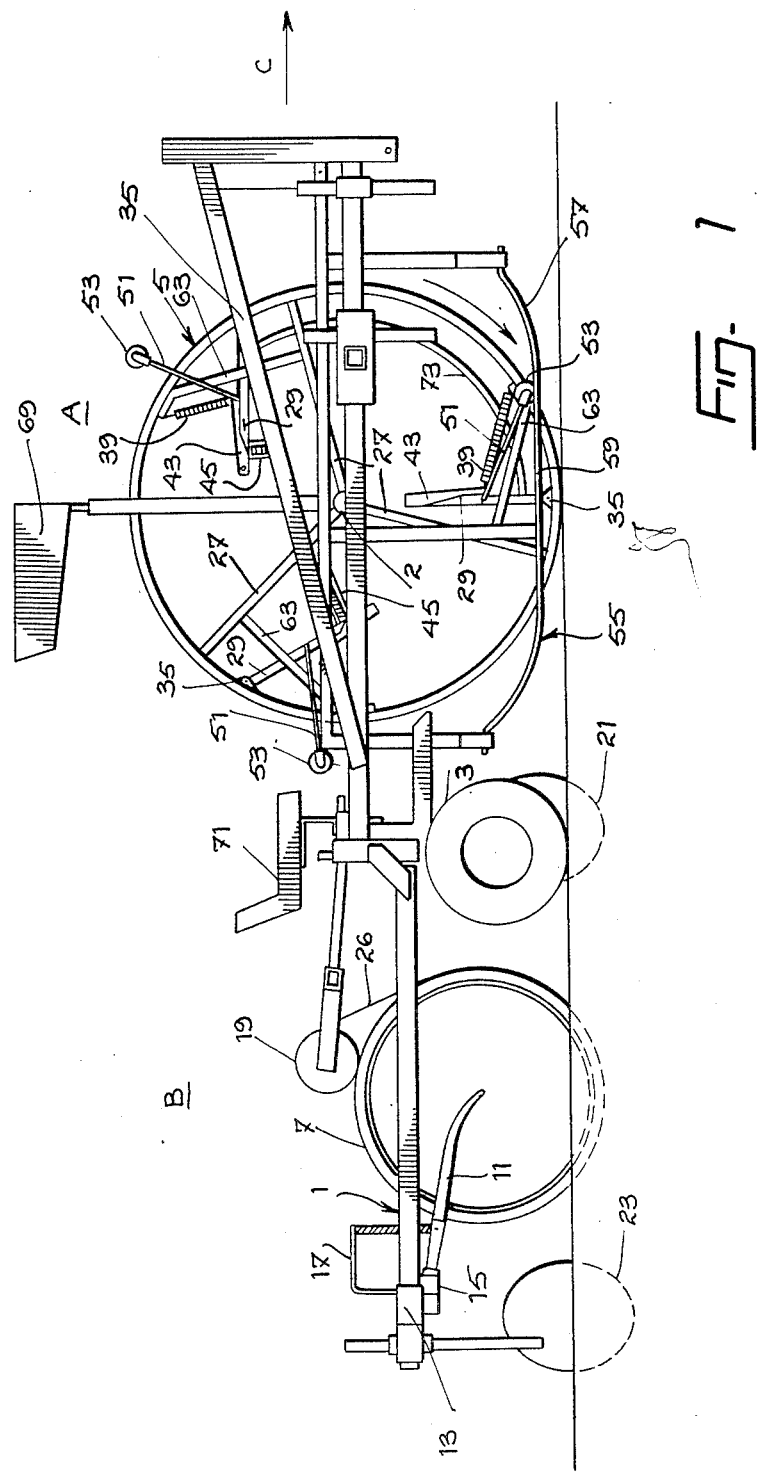
FIG. 1 is a diagrammatic side elevation view of an apparatus made according to the invention and FIG. 2 is a top plan view.
Figure 2:
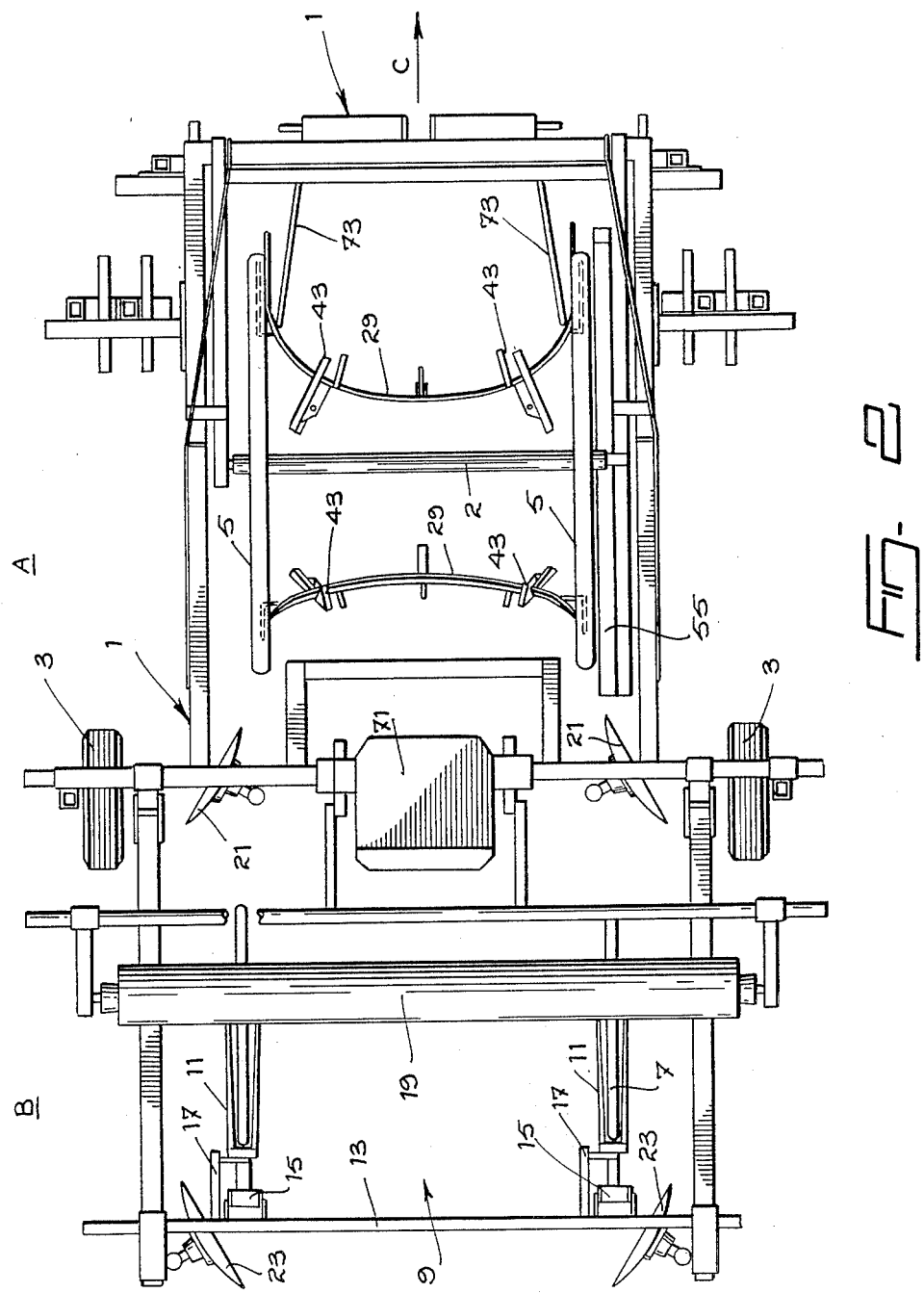

Shown in FIGS. 1 and 2 is a cultivating machine including a front part A, comprising the arch planting or driving apparatus according to the present invention, and a rear part B having a device for laying a sheet of thin flexible transparent or translucent polyethylene material or equivalent material over the arches that have been planted in the earth by the apparatus of part A. Both parts have a common frame or chassis 1 with rear wheels 3 for part B and front wheels 5 for part A. A hitch (not shown) is provided at the front of part A for towing the cultivating machine in the direction shown by the arrow C when suitably hitched to a tractor or the like.

The device of part B is already known and will not be described in detail. It comprises a pair of bicycle wheels 7, located on either side of the row of seeds 9 to be covered by the tunnel, the wheels 7 being held by forks 11 overhanging from a transverse member 13 of the frame 1. As shown in FIG. 2, the forks 11 are pivoted at 15 to the member 13 and resiliently held by spring means 17. A roll 19 of polyethylene perforated material is mounted on the frame 1 above the wheels 7. A pair of inclined front discs 21 open up furrows on either side of the row 9 while a like pair of inversely inclined rear discs 23 close them. By the action of the spring means 17, the wheels 7 are allowed to ride in the furrows before they are closed by the rear discs 23.

In operation, the perforated sheet of plastic material 25 (FIG. 1) unfolds from the roll 19 and is drawn by the bicycle wheels 7 into the furrows, being thereafter buried in the ground by the action of the rear discs 23. The sheet 25 must be sufficiently wide and loose between the two wheels 7 to allow for easy insertion beneath it of the arches planted by the apparatus of part A.

The latter is formed by the two aforesaid front wheels 5 mounted, in any known manner, for rotation on the chassis 1 through a shaft 2; each wheel 5 having a rim 24 and three spokes 27. Three arcuate arch supports 29 are provided between the wheels 5, each support 29 defining an outwardly open U-shaped trough 31 (FIG. 3) for the insertion of a rod first manually bent into an arch 33, as will be further explained hereinafter.

Figure 3:
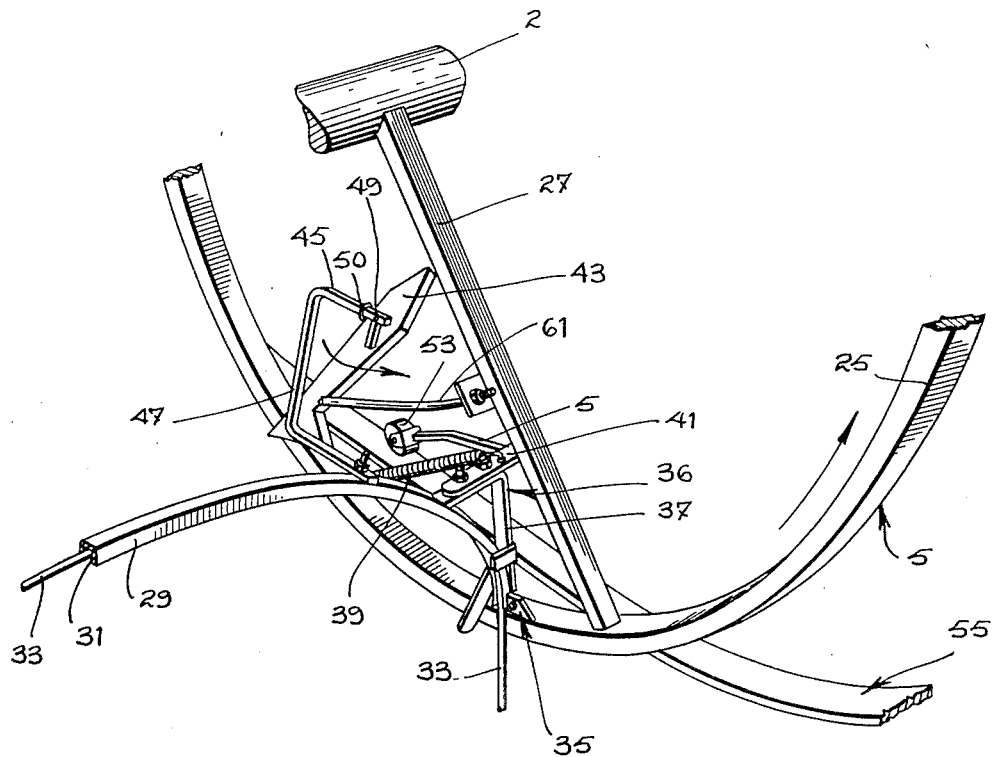
FIG. 3 is a perspective partial view of the arch support and its cam means.

The free ends of the arch supports 29 are mounted on the wheel rims 25 by conventional pivot means 35 to allow the supports to oscillate about axes parallel to the axis of the shaft 2. The pivot means 35 of each support are located adjacent a pair of wheel spokes 27 that lie in a common radial plane and are further located behind the aforesaid pair of wheel spokes 27 with respect to the direction of rotation of the wheels 5 (or rims 25) as best seen in FIGS. 1 and 3.

Each pivot means 35 may simply consist of a bracket, upstanding from the inner surface of the rim 25, and of a pin extending through the bracket and through an adjoining end of an arch support 29.

Each arch support 29 is held inwardly of the wheels 5 (or rims 25) and between them as well as in inoperative position (FIGS. 4 and 5) where the support 29 diverges from the adjacent pair of spokes 27, by first resilient means 36. The latter, as shown in FIG. 3, are made up of an angular member 37 secured at its ends to the support 29, and of a coil spring 39 fixed at one end to the rim 25 and fixed, at the other end, to a straight blade 41 bolted solid with one arm of the angular member 37.

A pair of hooks 43 are mounted on each arch support 29, by second resilient means 45, for pivotal movement between a hooking position (FIGS. 4, 5 and 6), holding the arch 33 within the trough 31, and a release position (FIGS. 3, 7 and 8) allowing the arch 33 to free itself from the trough 31. Each second resilient means 45, shown fully in FIG. 3 and only symbolically in FIG. 4, may comprise a bracket in the form of a stirrup member 47 of which one arm is secured to the arch support 29; the stirrup being strongly inclined toward the plane of the adjacent wheel 5. The hook 43 has its lever end pivotally mounted by a pin 49 at the end of the other arm of the stirrup 47; the pin 49 being perpendicular to the plane of the stirrup so that the hook 43 may likewise be inclined, at the same angle with respect to the plane of the wheel 5 or rim 25 as that of stirrup 47. A coil spring having one end 50 secured to the stirrup 47 and the other end (not shown) secured to the pivot pin or the hook 43 biases the latter toward hooking position, as shown by the arrow in FIG. 3.

Cam means are provided on the arch support 29 and on the chassis 1 and cooperate for pivoting the arch support 29, from its inoperative position, toward the adjacent wheel spokes 27 and for holding the support 29 into vertical position as the pivot means 35 approaches the ground. Specifically, as shown in FIG. 3, the cam means include a straight arm 51 fixed at one end to the straight blade 41 of the angular member 37; arm 51 having a cam follower in the form of a roller 53, at its other end; the arm 51 extending in the direction of an adjacent rim 25 and projecting over the rim. The cam means also include a cam member or track 55 having an upwardly curved front end 57 (see FIGS. 4 to 8) followed by a straight horizontal portion 59 standing above ground; the cam track 55 being secured, at its ends, to the chassis 1 (see FIG. 1, particularly).

Finally, hook releasing means are provided, on the spokes 27 of the wheels 5, for engaging the hooks 43 (FIG. 7) after the arch support 29 (and the arch 33 that it holds in its trough 31) has reached the vertical position to thereby force the hooks 43 into release position against their return coil springs 50. The said hook releasing means may be bars 61 fixed at one end to spokes 27 and projecting into the path of the hooks 43, the length of the bars being selected to engage the inwardly tilted hooks 43 as the arch supports 29 become vertical and, due to the inwardly inclined condition of the hooks 43, to slip away from the said hooks as the support 29 moves away from the vertical position thereby allowing biassing of the hooks 43 back into hooking position.

The operation of the above described apparatus will now be summarized as follows, reference being had to FIGS. 4 to 8. It should first be pointed out that, in these figures, the relative movement of the pivot point 35 with respect to the ground and the relative movement of the arch support 29 relative to the adjoining spoke 27 have been greatly exaggerated in order better to appreciate the operation of the apparatus. Two arrows show the displacement of the chassis 1 over the ground and the subsequent clockwise rotation of the wheel rims 25.

Figure 4:
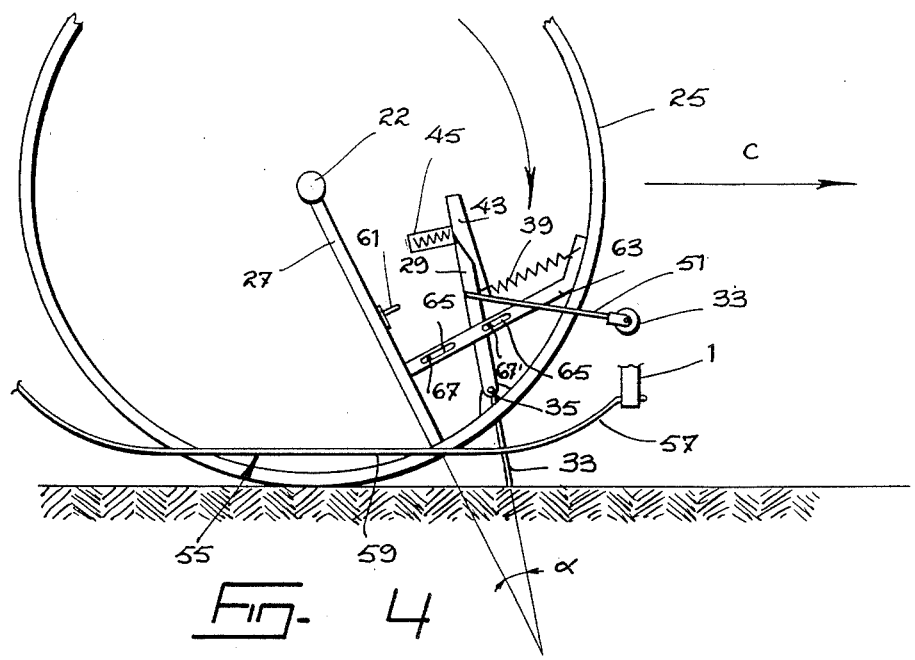
FIGS. 4, 5, 6, 7 and 8 are diagrams illustrating the arch support and its cam means in successive positions of one chassis wheel.

In FIG. 4, the end of the arch 33, still in its support 29, has just reached the ground and both make an angle α with the wheel spoke 27, angle which is determined by the spring 39, between the support 29 and the rim 25, in its unstretched condition.

Figure 5:
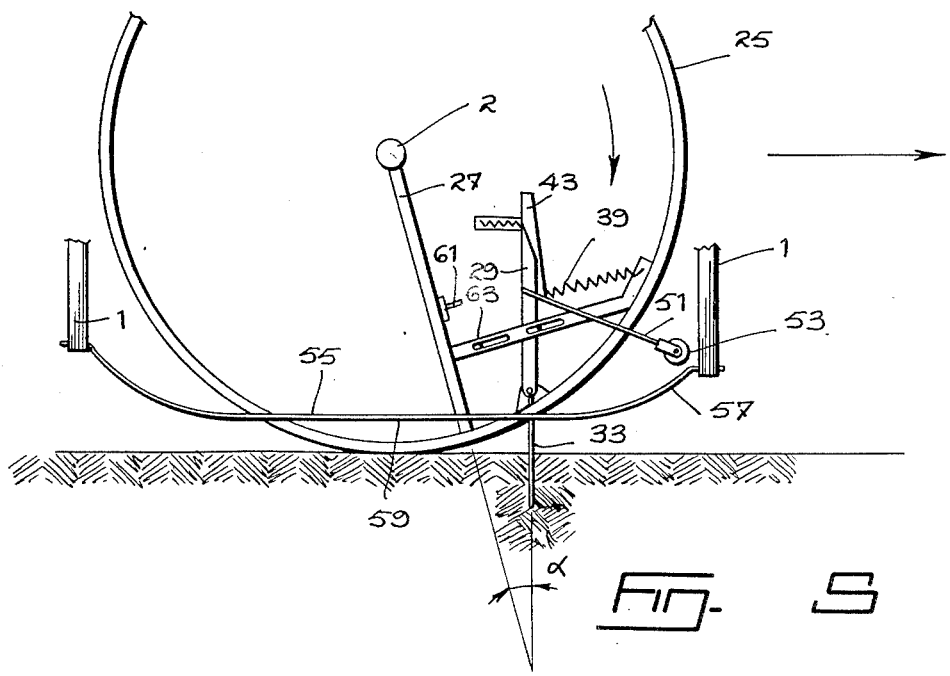

In FIG. 5, after a short further movement of the chassis 1 and clockwise rotation of the rim 25, the spring 39 still holds the support 29 at the same angle α with the spoke 27 but has pivoted the support 29 and arch 33 to the vertical position; driving part of the arch 33 into the ground. At that time also, the cam follower 53 enters the curve portion 57 of the cam track 55.

Figure 6:
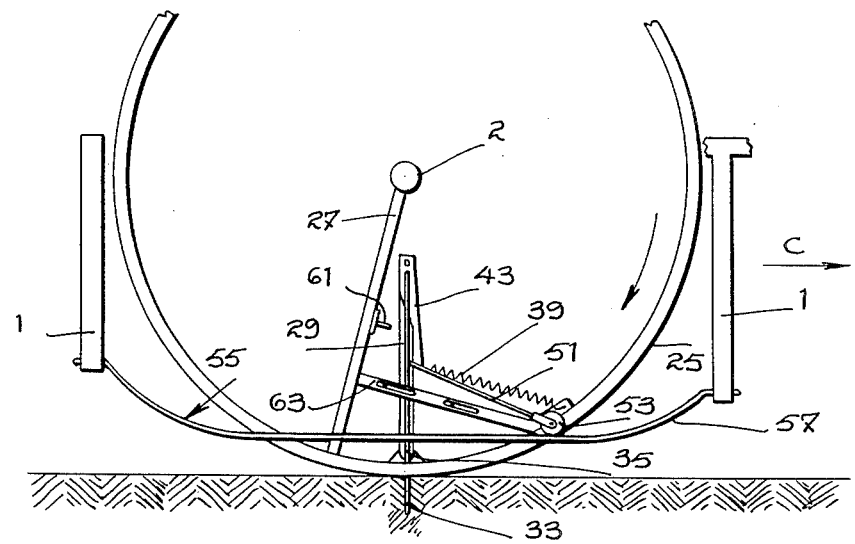
Figure 7:
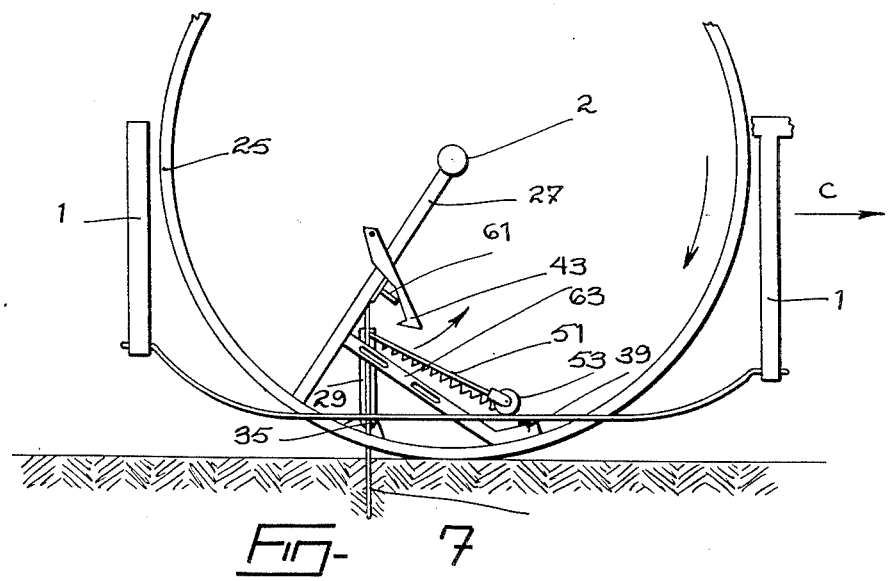
Figure 8:
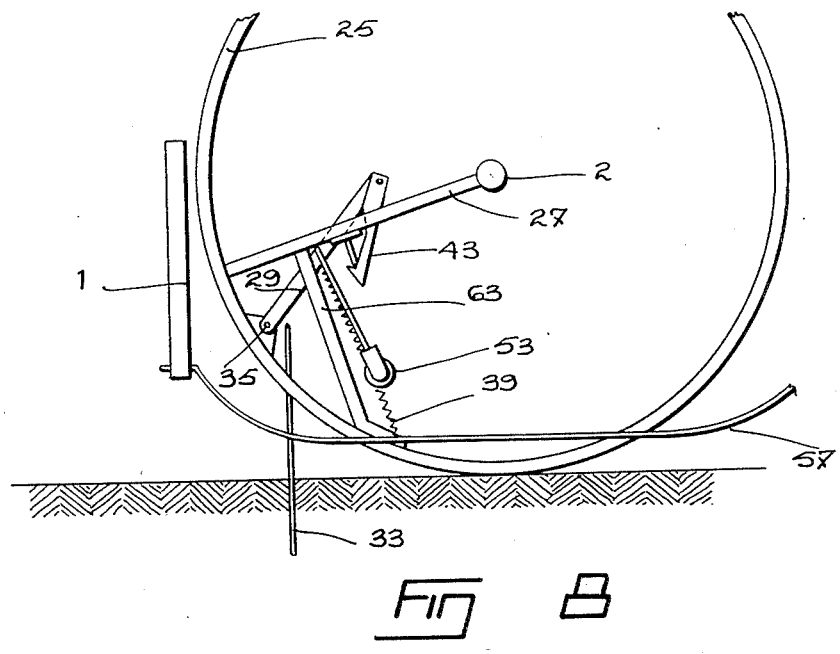

Further rotation of the wheel 5 and of its rim 25 shows, in FIG. 6, that the cam follower 53, riding on the horizontal portion 59 of the cam track 55, holds the support 29 vertical, through the stiff arm 51 and against the bias of the spring 29. However, the spoke 27 has moved close to the support 29. A still further clockwise movement of the wheel rim 25, as in FIG. 7, with the cam follower 53 remaining on the cam track 55 thereby still holding the support 29 and arch 33 vertical, brings the bar 61 against the hook 43 to force it into support release position, as shown. This frees the arch 33 from the support 29 as illustrated in FIG. 8.

All the time between the positions shown in FIGS. 4 to 7, the pivot point 35 has moved through the essentially straight vertical portion of a sinusoidal curve and that is the reason why it is possible to hold the support 29 and particularly the arch 33 essentially straight.

The movement has been explained for the support and arch on one of the wheels 5 but it is to be understood that the same movement is applied to the other end of the support 29 pivoted to the other wheel, and the caming means 51, 53 and 55 need be provided with respect to only one of the wheels.

Referring to FIG. 4, it may be advantageous to provide a stroke limiter for the arch support 29 to constrain its pivot angle. The stroke limiter may have the form of a straight bar 63 solid at one end with the spoke 27 and, at the other end, with the rim 25. The bar 63 has a pair of elongated slots 65, 65' and two screws 67 are releasably locked each in one of the slots. The screws 67 jutt out of the slots 65, 65', in the direction of the path followed by the support 29 and on either side thereof, thereby serving as limit stops.

Figure 9:
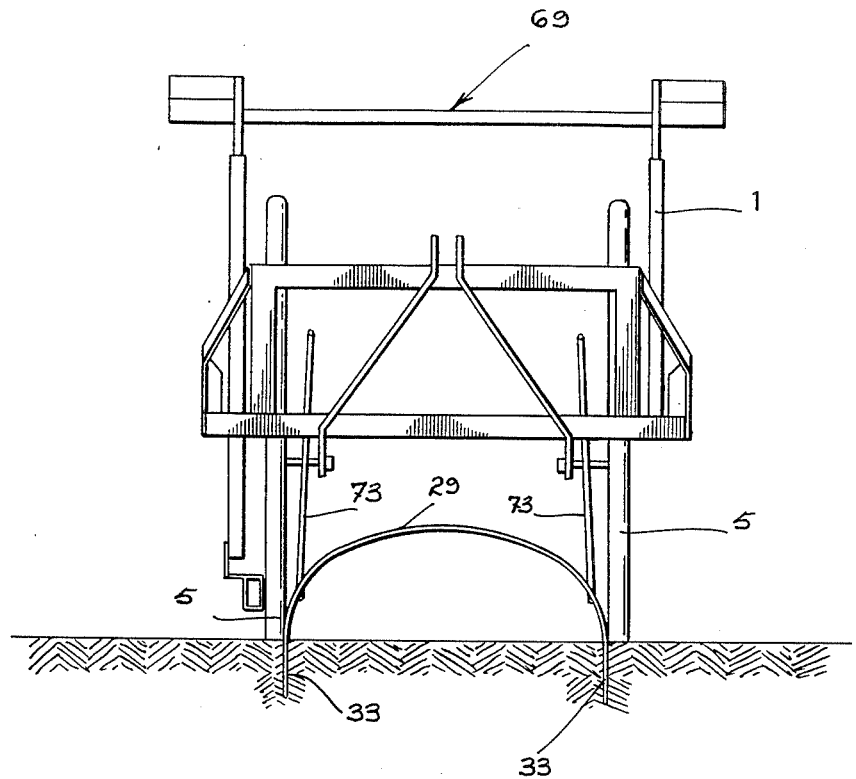
FIG. 9 is a diagrammatic front elevation view of the apparatus.

Referring now to FIGS. 1, 2 and 9, the straight wire rods that are used to make the arches 33 are housed in a box 69 above the wheels. An operator seating on a seat 71 picks them one at the time and introduces it into the arcuate trough 31 of a passing support 29 by temporarily manually moving the spring loaded hooks 43 out of the way. By doing so, the operator gives the rod an arcuate shape, between the hooks 43, which shape is that of the central portion of the final arch but the end portions of the rod lying outwardly of the hooks 43 are only partially bent and unsuitable because they are not parallel as they need be in order to be properly driven into the ground. The situation of the rod 33 at that moment is illustrated in broken lines in FIG. 2. Therefore, a pair of still straightening bars 73 are provided which, as seen in FIG. 2, are bent vertically into an arc of circle, being secured at the top only to the chassis 1, in any known manner. Also, as seen from above in FIG. 1, each bar 73 diverges outwardly in the direction of the rim of one of the wheels 5, terminating short of the rim at its lower end. In this manner, as the arch 33 moves clockwise, its outward portions engage first the top portions of the straightening bars 73 which force them gradually closer to the rims 25 of the wheels 5. Finally, the ends of the arch are straight and parallel when they reach the ground.

I claim:

1. An apparatus for driving wire rod arches into the ground for the making of a cultivation tunnel, said apparatus comprising:
    a chassis and a pair of wheels mounted on said chassis, each wheel having a rim and radial spokes with said wheels being rotative about a common axis;
    an arcuate arch support, between said wheels, defining an outwardly open trough for the insertion and removal of an arch;
    pivot means mounting the free ends of said arch support on said wheel rims; said pivot means being located adjacent a pair of said wheel spokes lying in a common radial plane; said support free ends being mounted for pivotal movement of said arch support about an axis parallel to said wheel common rotation axis; said pivot means being further located behind said pair of spokes with respect to the direction of rotation of said wheels;
    first resilient means for holding said arch support inwardly and between said rims and in an inoperative position where said arch support diverges from said pair of spokes;
    a plurality of hooks and means mounting said hooks on said arch support for pivotal movement of said hooks between a hooking position for holding an arch within said trough and a release position for allowing said arch to move out of said trough;
    second resilient means biasing said hooks into said hooking position;
    cam means on said arch support and on said chassis for pivoting said arch support from said inoperative position toward said adjacent wheel spokes and for holding said support in vertical position as said pivot means approaches the ground, and
    hook releasing means on said spokes of said pair of wheels; said releasing means engaging said hooks after said arch support has reached said vertical position for pivoting said hooks to said hook release position.

2. An apparatus as claimed in claim 1, wherein said cam means comprise:
    a straight arm fixed at one end to said arch support and provided with a cam follower at the other end thereof, said arm projecting toward an adjacent one of said rims, and
    a cam member, for said cam follower, on said chassis; said cam member being shaped to hold said arch support vertically when said follower member rides thereon.

3. An apparatus as claimed in claim 2, wherein said cam member has a curved portion followed by a straight horizontal portion located above the ground.

4. An apparatus as claimed in claim 3, wherein said cam follower is a roller.

5. An apparatus as claimed in claim 1, further comprising a stroke limiter, for said pivoting arch support, in the form of a straight bar fixed at one end to an adjacent spoke of said pair of spokes and fixed at the other end to an adjacent one of said rims; said bar having at least one elongated slot and two releasably locked screws extending through said slot and jutting out therefrom in the direction of and in the path of said arch member, on either side thereof.

6. An apparatus as claimed in claim 1, wherein each of said hooks has a lever part and a hooking part projecting laterally from said lever part, and said hook mounting means comprise, for each hook: a bracket secured at one end to said arch support and projecting from said arch support away from the opening of said trough; pin means pivotally mounting said lever part onto the other end of said bracket, and wherein said second resilient means comprises a coil spring having one end secured to said bracket and the other end to said hook lever part, constructed to bias said hook into said hooking position.

7. An apparatus as claimed in claim 6, wherein said hooks are mounted on said bracket in an inwardly tilted position with respect to said wheels and said hook releasing means comprise, for each hook, a bar fixed at one end to an adjacent one of said spokes of said pair of spokes to project into the path of said hook, the length of said bar being selected so as to engage said inwardly tilted hook when said arch support stands vertical and so as to slip away therefrom as said arch support moves away from said vertical position, whereby to allow biassing of said hook back into said hooking position.

8. An apparatus as claimed in claim 1, further comprising a pair of stiff rods fixed at one end to said chassis, said rods projecting between said wheels with respect to the direction of movement of said chassis; said rods being further outwardly directed toward said wheel rims so that the free ends thereof terminate close to said rims; said rods additionally curving downwardly so as gradually to force the ends of said arch against said rims and cause said arch ends to straighten up into parallel relationship.

9. An apparatus as claimed in claim 2, wherein said cam follower and cam member of said cam means are located outwardly of said adjacent one of said rims.

* * * * *